US012704369B2

(12) United States Patent
Gaillard-Groleas et al.

(10) Patent No.: US 12,704,369 B2
(45) Date of Patent: Aug. 11, 2026

(54) LOW-BULK INTERFEROMETRIC SENSOR

(71) Applicant: SCIENCES ET TECHNIQUES INDUSTRIELLES DE LA LUMIERE, Aix-en-Provence (FR)

(72) Inventors: Jérôme Gaillard-Groleas, Aix en Provence (FR); Sébastien Gerand, Marignane (FR); Gabrielle Moussu, Vitrolles (FR)

(73) Assignee: SCIENCES ET TECHNIQUES INDUSTRIELLES DE LA LUMIERE, Aix-en-Provence (FR)

(*) Notice: Subject to any disclaimer, the term of this patent is extended or adjusted under 35 U.S.C. 154(b) by 86 days.

(21) Appl. No.: 18/864,739

(22) PCT Filed: May 19, 2023

(86) PCT No.: PCT/FR2023/050719

§ 371 (c)(1),
(2) Date: Nov. 11, 2024

(87) PCT Pub. No.: WO2023/222988

PCT Pub. Date: Nov. 23, 2023

(65) Prior Publication Data

US 2025/0314475 A1 Oct. 9, 2025

(30) Foreign Application Priority Data

May 19, 2022 (FR) ....................................... 2204772

(51) Int. Cl.
*G01B 9/02* (2022.01)
*G01B 9/02015* (2022.01)
*G01B 11/06* (2006.01)

(52) U.S. Cl.
CPC ..... *G01B 9/02016* (2013.01); *G01B 9/02042* (2013.01); *G01B 11/0608* (2013.01)

(58) Field of Classification Search
CPC ............ G01B 9/02016; G01B 9/02042; G01B 11/0608; G01B 9/02064; G01B 9/0209
See application file for complete search history.

(56) References Cited

U.S. PATENT DOCUMENTS 10,107,614 B1 10/2018 Kay
2008/0151253 A1* 6/2008 Korner .............. G01B 9/02057
(Continued)

FOREIGN PATENT DOCUMENTS

DE 19504189 A1 8/1996
DE 102020104386 A1 8/2021
(Continued)

OTHER PUBLICATIONS

French Search Report in related French Application No. 2204772, mailed Dec. 20, 2022.
(Continued)

*Primary Examiner* — Hwa Andrew Lee
(74) *Attorney, Agent, or Firm* — Thomas | Horstemeyer, LLP

(57) ABSTRACT

The present invention relates to an objective (3) for a confocal system (1) of spectral interferometric measurement, comprising: —a source hole (14); —a second beam splitter (12) having a partially reflective face (12*a*), —a first beam splitter (10) having a face which is configured to form a reference surface (6) and being located between the source hole (14) and the second beam splitter (12); and—lenses (11, 13). The first and second beam splitters are positioned in the objective (3) such that an optical distance ($d_{ref}$) between the reference surface (6) and the partially reflective surface (12*a*) is substantially equal to an optical distance ($d_m$) between the partially reflective surface (12*a*) and a focal plane of the objective (3).

13 Claims, 3 Drawing Sheets

(56) References Cited

U.S. PATENT DOCUMENTS

2010/0292539 A1* 11/2010 Lankenau .......... G01B 9/02091
600/167
2012/0133946 A1* 5/2012 Eckman ............. G02B 23/2423
356/450

FOREIGN PATENT DOCUMENTS

EP 1805477 B1 4/2009
WO 201620462 A 2/2016

OTHER PUBLICATIONS

PCT Search Report in related PCT Application No. PCT/FR2023/050719, mailed Jul. 17, 2023.

* cited by examiner

LOW-BULK INTERFEROMETRIC SENSOR

CROSS REFERENCE TO RELATED APPLICATIONS

This application is the 35 U.S.C. § 371 national stage application of PCT Application No. PCT/FR2023/050719, filed May 19, 2023, which application claims the benefit of French Application No. FR 2204772 filed May 19, 2022, both of which are hereby incorporated by reference herein in their entireties.

TECHNICAL FIELD

The disclosure relates in general to the field of inspection and optical control of a part, and more precisely to the measurement of a height of a surface of a sample or its thickness using an optical device.

BACKGROUND

Currently, optical comparator measurement devices exist comprising an optical sensor that can measure the topography (height/distance) of a surface of a sample and/or its thickness, at a point and without contact.

In order to carry out measurements with nanometre precision (less than 10 nm), it is possible, in particular, to use a spectral interferometric measurement probe. For this purpose, a white light is focused by an objective, then separated into two beams by a semi-reflective plate. One of these beams is reflected by the sample that it is desired to characterise; the other of the beams is reflected on a reference surface placed in the measurement probe. The two beams then recombine before being transmitted to a processing unit comprising a spectral analysis system. The spectral analysis system then generates a band spectrum comprising fringes resulting from the interference of the recombined beams, and the frequency of which depends, in particular, on the difference in distance between the surface of the sample and the reference surface.

These interferometric probes can obtain very precise confocal measurements. However, their bulk is large because they require the presence of a reference surface close to the output of the light beam, which prevents their use when the size or shape of the sample is not suitable.

Furthermore, these probes cannot be bent in order to carry out radial measurements (in a plane normal to the image focal plane) without drastically increasing their bulk, because the working distance would not then be sufficient, considering the numerical aperture required so as not to lose the confocal measurement signal.

SUMMARY

An aim of the present application is to overcome the above-mentioned disadvantages, by proposing a measurement probe, which can achieve a precision of several nanometres and the bulk of which, in particular at the objective, is less than for conventional interferometric measurement probes.

For this purpose, according to a first aspect, an objective is proposed for a confocal system for spectral interferometric measurement comprising:

- a source hole;
- a first beam splitter having a face configured to form a reference surface;

- a second beam splitter having a partially reflective face, the second beam splitter being positioned downstream of the first beam splitter such that the first beam splitter is located between the source hole and the second beam splitter; and
- lenses.

The first beam splitter, the second beam splitter and the lenses are coaxial such that the optical axes of the first beam splitter, the second beam splitter and the lenses are coincident. Moreover, the first beam splitter and the second beam splitter are positioned in the objective such that an optical distance between the reference surface and the partially reflective surface is substantially equal to an optical distance between the partially reflective surface and a focal plane of the objective.

The first beam splitter comprises at least one of the following elements: an assembly formed of a lens and a partially reflective plate; a lens, one face of which is devoid of anti-reflective treatment; a lens on which a mirror is attached and fixed, the area of which is less than an area of the lens, and the lenses comprise a first lens positioned between the first beam splitter and the second beam splitter and a second lens positioned downstream of the second beam splitter, an optical distance between the first lens and the second beam splitter being equal to an optical distance between the second beam splitter and the second lens.

Some preferred, but non-limiting, characteristics of the objective according to the first aspect are the following, taken individually or in combination:

- optical characteristics of the first lens and the second lens are identical, in particular their focal distance;
- the distance between the first lens and the second beam splitter is equal to the distance between the second beam splitter and the second lens;
- the objective further comprises a mirror mounted downstream of the first beam splitter, the second beam splitter and the lenses, the mirror being inclined with respect to the optical axis of the lenses in order to bend a light beam that it receives from the lenses;
- the first beam splitter is divergent and the first lens is convergent, or the first beam splitter is convergent and the first lens is divergent;
- the first beam splitter comprises at least one of the following elements: an assembly formed of a lens and a partially reflective plate; a lens, one face of which is devoid of anti-reflective treatment; a lens on which a mirror is attached and fixed, an area of which is less than an area of the lens; and/or
- the source hole further forms a filtering hole of the objective.

According to a second aspect, a confocal system for spectral interferometric measurement is proposed, wherein the confocal system comprises a light source and an objective according to the first aspect, in which objective, the light source is connected to the source hole, for example using an optical fibre.

Some preferred, but non-limiting, features of the confocal system for spectral interferometric measurement according to the second aspect are the following, taken individually or in combination:

- the light source is polychromatic; and/or
- the system further comprises a processing unit connected to the objective; where applicable, the processing unit comprises a spectrograph connected to the objective by means of an optical fibre.

DESCRIPTION OF THE FIGURES

Other features, aims and advantages will emerge from the following description, which is given purely by way of illustration and not being limiting and which should be read with reference to the attached drawings, in which.

In all the figures, similar elements have identical reference signs.

DETAILED DESCRIPTION

Figures 1, 2:
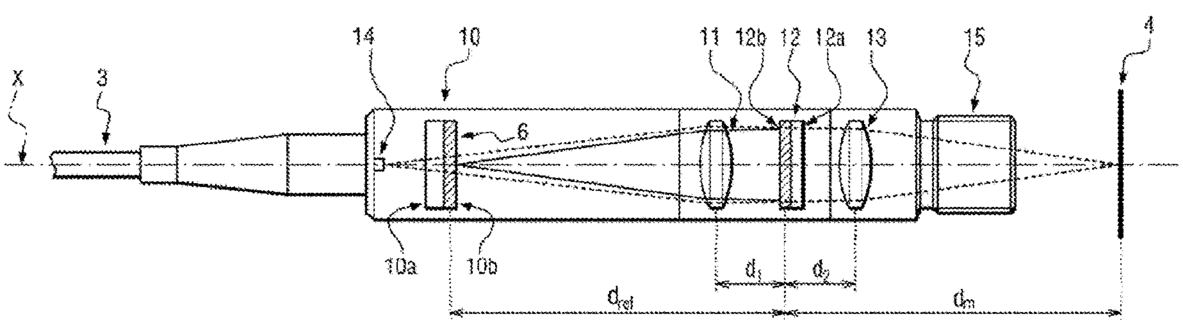
FIG. 1 schematically illustrates an example objective for spectral interferometric measurement according to an embodiment, in which the path of the light beam is shown.
FIG. 2 illustrates, very schematically, an example of a system for spectral interferometric measurement.

A spectral interferometric measurement system 1 comprises a light source 2, an objective 3 connected to the light source 2 and configured to focus the light beam on the surface to be characterised 4 of a sample and a processing unit 5 configured to characterise the surface on the basis of recombined light beams reflected on the surface 4 of the sample and on a reference surface 6. The measurement system 1 can, in particular, carry out surface topography measurements and thickness measurements of transparent media (such as the thickness of a glass wall).

An application example comprises, for example, determining the absence of roughness on a smooth or polished surface to be characterised of a sample (by movement of the measurement system 1 with respect to the surface in order to determine the topography of this surface), by determining the difference in distance between the surface 4 of the sample and the objective 3 at a plurality of points of the surface to be characterised 4. Another application example comprises determining the thickness of a transparent wall by determining difference in distance between the two faces of the wall.

The light source 2 may comprise a polychromatic light, typically a white light. The processing unit 5 comprises a spectrograph 7 and processing means 8 connected to the spectrograph 7 via a data transmission cable 9.

In a manner known per se, the light source 2 and the spectrograph 7 can be housed in one or more optronics enclosures, which can be connected to the objective 3 via at least one optical fibre F. Where applicable, the objective 3 can also be housed in the optronics enclosure. It should be noted that, in this case, the optical fibres are optional.

The measurement system 1 is of the confocal type. Furthermore, it is achromatic, so that the beam leaving the objective 3 is focused at a single point.

The objective 3 comprises:

- a source hole 14;
- a first beam splitter 10 having a face configured to form a reference surface 6;
- a second beam splitter having a partially reflective face 12*a*, the second beam splitter 12 being positioned downstream of the first beam splitter 10 such that the first beam splitter 10 is located between the source hole and the second beam splitter 12; and
- lenses 11, 13.

The first beam splitter 10, the second beam splitter 12 and the lenses 11, 13 are coaxial, such that the optical axes X of the first beam splitter 10, the second beam splitter 12 and the lenses 11, 13 are coincident. Moreover, the first beam splitter 10 and the second beam splitter 12 are positioned in the objective 3 such that an optical distance $d_{ref}$ between the reference surface 6 and the partially reflective surface 12*a* is substantially equal to an optical distance $d_m$ between the partially reflective surface 12*a* and a focal plane of the objective 3.

Here, "substantially equal" shall be understood to mean that the difference between the distances $d_{ref}$ and $d_m$ is less than the coherence length of the light source in order to generate interference.

Here, "optical distance" shall be understood to mean the distance travelled by a light ray, taking into account the refractive indices that the ray has encountered along its path.

This configuration thus enables the objective 3 to have a low bulk, the reference surface 6 being placed in the objective 3, at the first beam splitter 10, while having a sufficient numerical aperture.

The source hole 14 (upstream side of the objective 3) is configured to be connected to the light source 2. For example, the source hole 14 can correspond to the output of an optical fibre F, the input of which is connected to the light source 2. The objective 3 also has an output end 15 (downstream side of the objective 3) configured to be placed close to of the surface to be characterised 4 such that the surface to be characterised 4 is located in the image focal plane of the objective 3. The first beam splitter 10 is therefore located close to the source hole 14 of the objective 3, whereas the second lens 13 is positioned close to its output end 15, on the object side.

In the following, for simplicity, the disclosure will be made in the case where the objective comprises a first lens 11 placed between the first beam splitter 10 and the second beam splitter 12, and a second lens 13 placed between the second beam splitter 12 and the output end 15. Moreover, the lenses 11, 13 are disposed in the objective 3 such that the optical distance $d_1$ between the first lens 11 and the second beam splitter 12 is equal to the optical distance $d_2$ between the second beam splitter 12 and the second lens 13. In the case where the optical characteristics of the first lens 11 and the second lens 13 (in particular their focal distance, their convergence/divergence, etc.) are identical, the distance between the first lens 11 and the second beam splitter 12 is equal to the distance between the second beam splitter 12 and the second lens 13. This is not however limiting, the number and type of lenses 11, 13 of the objective 3 depending on the type of objective 3 produced. In particular, each lens 11, 13 can be formed by a doublet or an assembly of several lenses calculated in order to obtain good correction of the aberrations. For example, the objective 3 can comprise convergent groups for focusing the beam on the surface 4, convergent or divergent groups on the optical fibre side F which can have a more compact system (telephoto-type convergent/divergent combination) or convergent as a function of the desired magnification, and a quasi-collimated beam, slightly convergent or divergent at the second beam splitter 12. Using a confocal configuration (point source and coincident detector at the end of an optical fibre) requires very high quality optics, close to diffraction, typically with a lambda/4 surface defect.

Here, "beam splitter" will be understood to mean an optical device which splits an incident light beam into two light beams: a first light beam which passes through the beam splitter without modification of its trajectory, and a light beam which is reflected by a partially reflective face of the beam splitter, in a direction forming a different angle equal to 180° (change of direction) relative to the incident light beam. Examples of beam splitters include, in a non-limiting manner, a separator plate, a partially reflective mirror or else a beam separator cube. As will be seen below, the first beam splitter 10 is preferably divergent or convergent in order to adjust the magnification between the source hole 14 and the surface 4 of the sample.

The first beam splitter 10 is mounted in the objective 3 such that the partially reflective face (which corresponds to the reference face 6) is located opposite the second beam splitter 12 (and therefore the first lens 11). Thus, the entire incident beam passes through the first beam splitter 10 in order to reach the first lens 11. On the other hand, only a part of the beam reflected by the second beam splitter 12 is transmitted to the processing unit 5, the other part being reflected towards the first lens 11 by the partially reflective face (which forms the reference surface 6 of the first beam splitter 10).

The second beam splitter 12 is mounted in the objective 3 such that only a part of the incident beam passes through the second beam splitter 12, the other part being reflected towards the first beam splitter 10 by its partially reflective face 12*a*.

The percentage of the incident beam which is reflected by each beam splitter can be dimensioned according to needs. In particular, the beam splitter does not necessarily split the incident beam into two beams of same intensity (50/50).

The first beam splitter 10, the first lens 11, the second beam splitter 12 and the second lens 13 are placed successively in the objective 3 along the optical path of the incident light beam, between the source hole 14 and the output end 15 of the objective 3.

In this way, the light beam (dotted line in FIG. 1) enters the objective 3, at the source hole 14, where it passes through the first beam splitter 10. The first beam splitter 10 is preferably divergent (respectively, convergent), such that the incident beam diverges (respectively converges) at the output of the first beam splitter 10 in the direction of the first lens 11. The light beam then passes through the first lens 11 before reaching the second beam splitter 12. The first lens 11 is preferably convergent (respectively, divergent) when the first beam splitter is divergent (respectively, convergent). During its passage through the second beam splitter 12, the incident beam splits into a first beam (dotted line in FIG. 1) which follows its path in order to reach the surface to be characterised 4 of the sample and a second beam (solid lines in FIG. 1) which is reflected by the second beam splitter 12 in order to reach the reference surface 6.

More precisely, the first beam (dotted lines in FIG. 1) exits the second beam splitter 12 by its output face, passes through the second lens 13 and exits the objective 3 via its output end 15 before reaching the surface 4 of the sample, where it is reflected. By return effect of the light, the first reflected beam passes successively back through the second lens 13, the second beam splitter 12, the first lens 11 and the first beam splitter 10 and is focused at the source hole 14. The source hole 14 thus forms a filtering hole for the reflected beam. The reflected beam exits via the hole 14 of the objective 3, towards the processing unit 5, for example by means of an optical fibre F.

The second beam (solid lines in FIG. 1) comes from the partial reflection of the incident beam on the second beam splitter 12. After its reflection on the partially reflective face of the second beam splitter 12, the second beam passes through the first lens 11. The first lens being convergent, the second beam is defocused with respect to the source hole 14 (which also forms a filtering hole) and cannot therefore exit via the source hole 14 towards the processing unit. The second light beam, by contrast, is reflected by the reference surface 6 of the first beam splitter 10. It then passes back through the first lens 11 then is reflected by the second beam splitter 12, where it is recombined with the first reflected beam in order to generate interference. The second reflected beam, together with the first reflected beam, then passes through the first lens 11 and the first beam splitter 10. Due to the convergence (respectively, divergence) of the first lens and to the divergence (respectively, convergence) of the first beam splitter 10, the second beam is then focused on the source hole 14 and can therefore exit again via the source hole 14 of the objective 3 towards the processing unit 5. Furthermore, the lenses 11 and 13 being convergent (respectively, divergent), the optical beam between these two lenses 11, 13 is not collimated. The optical path of the incident beam and the second beam are therefore not coincident, which avoids the disturbance of the reflected beam and therefore of the measurement.

As indicated above, the reference distance $d_{ref}$, which corresponds to the optical distance between the reference surface 6 of the first beam splitter 10 and the partially reflective face 12*a* of the second beam splitter 12, is substantially equal to the measurement distance $d_m$, which corresponds to the optical distance between the partially reflective face 12*a* of the second beam splitter 12 and the image focal plane of the objective 3 (in which the surface to be characterised 4 of the sample is placed). In this way, the reference distance $d_{ref}$ which is travelled by the second beam, through its reflection on the partially reflective face 6 of the first beam splitter 10 and on the partially reflective face 12*a* of the second beam splitter 12, is substantially equal to the measurement distance $d_m$ which is travelled by the first beam when it is reflected on the surface 4 of the object. The reference distance $d_{ref}$ being known, since the position of the reference surface 6 of the first beam splitter 10 relative to second beam splitter 12 is known (and, where applicable, fixed), it is then possible to determine, using the processing unit 5, the measurement distance $d_m$ between the second beam splitter 12 and the surface to be characterised 4 of the object.

In an embodiment, the reference distance $d_{ref}$ is fixed. In an alternative, the first and/or the second beam splitter 10, 12 can be movably mounted in the objective 3 in order to compensate the manufacturing tolerances of the various components and to adjust the reference distance $d_{ref}$ and the measurement distance $d_m$ to substantially identical values. Where applicable, the adjustment distance of the first and/or second beam splitter 10, 12 is between 0.10 mm and 0.50 mm.

Figure 3:
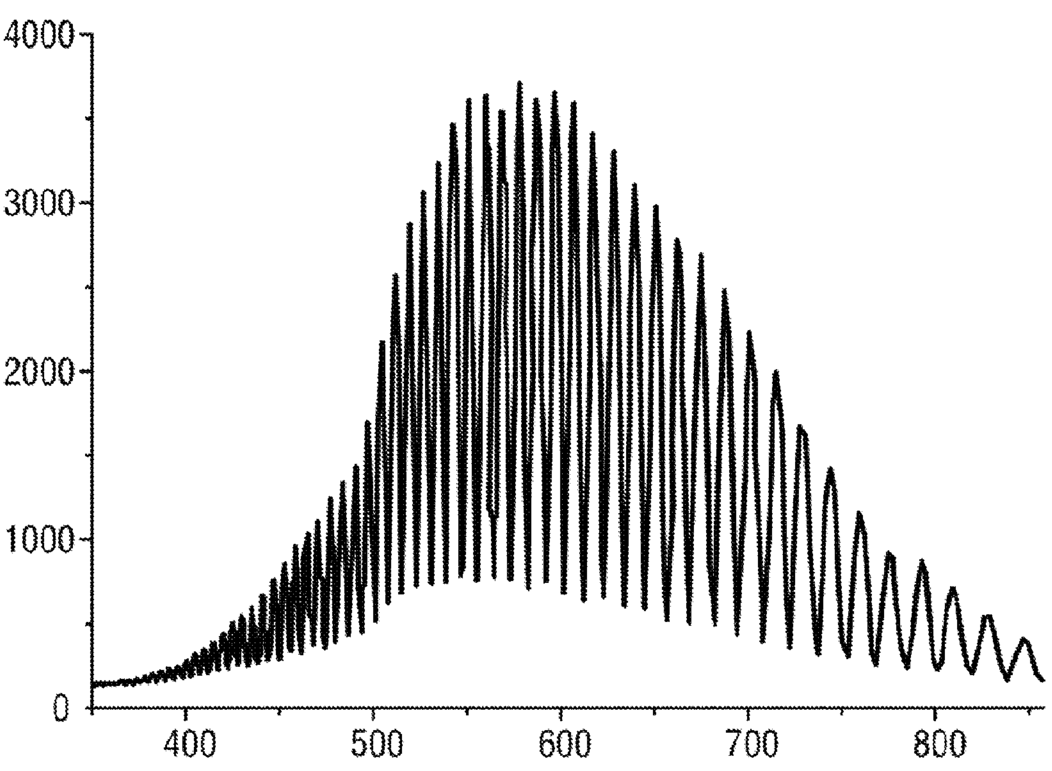
FIG. 3 is a graph illustrating the intensity of an exemplary band spectrum as a function of the wavelength (in nm) that can be obtained by a spectrograph of a system for spectral interferometric measurement receiving recombined beams which interfere.

The recombined light beam, which comes from the recombination of the first beam and the second beam at the second beam splitter 12, is then transported to the spectrograph 7, for example via an optical fibre F, which generates, based on this recombined beam, a signal (band spectrum) representative of the interference between the two beams (see FIG. 3). The signal is then transmitted to the processing means 8 which deduce, from the band spectrum, the measurement distance $d_m$ (by difference with the reference distance $d_{ref}$). More specifically, the band spectrum is formed of a plurality of fringes, the frequency of which depends on the virtual thickness between the reference surface 6 and the surface 4 of the object, which corresponds in practice to the difference between the reference distance $d_{ref}$ and the measurement distance $d_m$ (and the refractive index of the material constituting the surface 4 of the object). In particular, the higher the frequency of the fringes, the greater the difference in distance.

The processing means 8 thus make it possible to determine, in a precise and reliable manner, the difference in distances between the reference surface 6 and the surface to be characterised 4, and thus the position of the surface to be characterised 4 with respect to the objective 3.

The processing means 8 comprise, for example, a computer or a server suitable for processing the signals generated by the spectrograph 7 and deducing from them the difference in distances, comprising a calculator of the processor, microprocessor, microcontroller type, etc. The system also comprises control means (touch screen, keyboard, mouse, buttons, etc.) of the processing means 8.

The first lens 11, the second beam splitter 12 and the second lens 13 being coaxial and aligned (their optical axis X is rectilinear), the second beam splitter 12 is "vertical", in other words the incident beam and the split beams are co-linear. The first beam splitter 10 being likewise coaxial with the lenses and the second beam splitter 12 such that its optical axis X is rectilinear and coincident with that of the lenses and of the second splitter, it is therefore also "vertical"

By using coaxial optical devices, the optical axes of which are coincident, the objective 3 obtained is perfectly coaxial and linear, which reduces its bulk—in particular at the output end 15 of the objective 3 which is located close to of the object—and simplifies its manufacture and the adjustment of its components.

The first beam splitter 10 can comprise any device capable of splitting the incident beam into two beams.

In a first embodiment, the first beam splitter 10 comprises an assembly formed of a lens 10*a* (divergent or convergent) and of a partially reflective "vertical" plate 10*b*. In this embodiment, the first beam splitter 10 is therefore co-linear with the first lens 11. The partially reflective plate has a partially reflective face (preferably perpendicular to the optical axis X of the first lens 11) which is configured to reflect a predetermined quantity of the first beam sent back by the second beam splitter 12 to the first lens 11, for example 25%, 30% or 50% of the first beam.

This first embodiment has the advantage of being very simple to produce and to adjust. Preferably, the lens of the first beam splitter 10 is placed between the source hole 14 and the partially reflective plate. Furthermore, the partially reflective plate is positioned in the objective 3 such that its partially reflective face forms the reference surface 6 and is placed on the side of the second beam splitter 12 and extends at an optical distance equal to the reference distance $d_{ref}$ of the partially reflective face 12*a* of the second beam splitter 12.

In a second embodiment, the first beam splitter 10 comprises a lens (such as lens 10*a*), for which the output face 10*b* (facing the second lens 13) is not anti-reflective treated. This type of lens 10 is already used in Mirau interferometers. Because of the absence of anti-reflective treatment, the output face 10*b* of this lens reflects approximately 4% of the beam sent back by the second beam splitter 12. However, such a reflection percentage proves sufficient to interfere with the beam reflected by the surface to be characterised 4 of the object and for deducing the measurement distance $d_m$, between the object and the objective 3. The lens 10*a* is thus positioned in the objective 3 such that its (untreated) output face 10*b* forms the reference surface 6 and extends at a distance of the partially reflective face 12*a* of the second beam splitter 12 equal to the reference distance $d_{ref}$.

Figure 5:
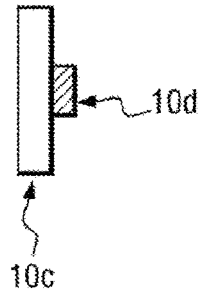
FIG. 5 illustrates an exemplary embodiment of a beam splitter which can be used in an objective for spectral interferometric measurement according to an embodiment.

In a third embodiment (FIG. 5), the first beam splitter 10 comprises a lens 10*c* (such as lens 10*a*) and a reflective mirror 10*d* of smaller dimensions than the incident beam. The reflective mirror 10*d* can, in particular, be fixed on the output face, for example at the centre of the output face of the lens 10*c*. This configuration has the effect of partially blocking the incident beam while allowing the remainder of the beam to pass. It should be noted that the presence of the reflective mirror 10*d* does not in any way prevent the measurement, since the system is of the confocal type. The only consequence therefore is a reduction in the power of the light beam (since less light arrives on the object). The lens 10*c* and the reflective mirror 10*d* are thus placed in the objective 3 such that the reflective face of the reflective mirror 10*d* forms the reference surface 6 and is located at a distance from the partially reflective face 12*a* of the second beam splitter 12 equal to the reference distance $d_{ref}$.

Similarly, the second beam splitter 12 can comprise one of the set formed by a lens 10*a* and a partially reflective plate 10*b*, the lens 10*a* for which the output surface 10*b* is devoid of anti-reflective treatment or a lens 10*c* and a reflective mirror 10*d* at its centre. According to another alternative, the second beam splitter 12 can comprise a lens (such as lens 10*a*) the output surface of which is formed by a "polkadot" type surface mirror (in other words, a predetermined percentage of the output surface comprises discreet mirror-type reflecting zones).

The first and second beam splitter 12 can be identical or different.

Figure 4:
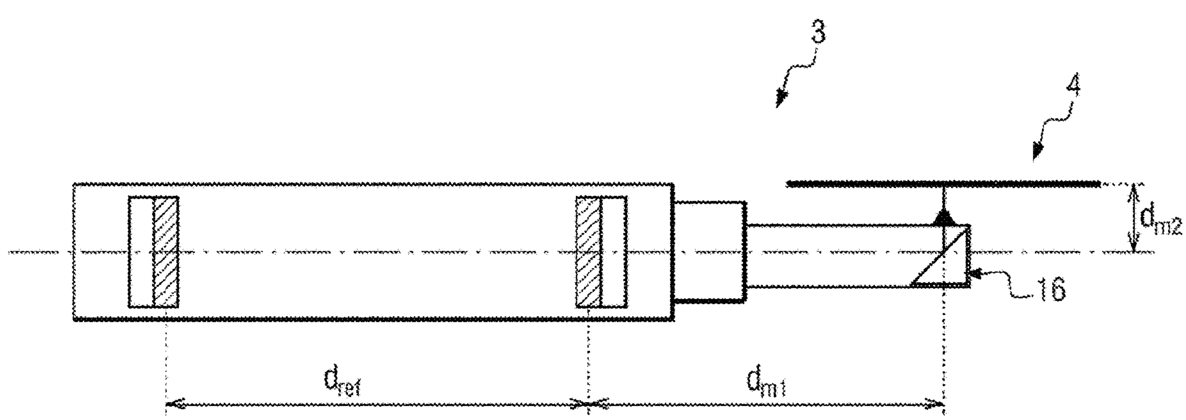
FIG. 4 schematically illustrates another example of an objective for spectral interferometric measurement in accordance with an embodiment enabling radial measurements.

In an embodiment, the objective 3 further comprises a mirror 16 fixedly mounted downstream of the second beam splitter 12, typically downstream of the output end 15. The mirror 16 is inclined with respect to the optical axis X of the objective 3 in order to bend the light beam which it receives at the output of the objective 3 and to carry out measurements on a surface which does not extend perpendicularly to the optical axis X of the second lens 13 (see for example FIG. 4). For example, the mirror 16 forms an angle of 45° with the optical axis X of the second lens 13 in order to bend the light beam by 90°. The surface to be characterised 4 is therefore perpendicular to the optical axis X of the second lens 13.

The performance of "radial" measurements, using the inclined mirror 16, is made possible in particular by the positioning of the reference surface 6 close to the source hole 14 of the objective 3, thus increasing the distance travelled by the light beam after its reflection on the second beam splitter 12. The measurement distance $d_m$ then corresponds to the optical distance between the second lens 13 and the surface 4 of the object, which is located in the image focal plane of the objective 3 with respect to the inclined mirror 16. In other words, the measurement distance $d_m$ corresponds to the sum of the optical distance $d_{m1}$ between the second lens 13 and the intersection between its optical axis X and the mirror 16, and the optical distance $d_{m2}$ between this intersection and the surface to be characterised 4.

Optionally, the measurement system 1 also comprises means enabling the objective 3 to be moved with respect to the object so as to determine the roughness of the surface 4 of the object. In particular, during the movement of the objective 3 with respect to the object, the frequency of the band spectrum which is measured by the spectrograph 7 varies, the variations corresponding to the differences in measured distance.

The movement means can be configured to move the object, the objective 3 being fixed, or vice versa. As an alternative, the movement means can be configured to move both the objective 3 and the object.

Where applicable, the processing unit 5 can be configured to determine the thickness of a transparent wall. The transparent wall has a first face defining a first, air/material interface and a second face defining a second, material/air interface. The second light beam is therefore partly reflected at the first interface, the other part passing through the wall before being at least partly reflected at the second interface. Each reflected part of the light beam is then recombined and interferes with the first light beam (which is reflected by the second beam splitter 12).

The recombined beams are then transmitted to the spectrograph 7, which generates a signal comprising fringes having three distinct frequencies, namely a first frequency corresponding to the virtual thickness between the reference surface 6 and the first interface, a second frequency corresponding to the virtual thickness between the reference surface 6 and the second interface, and a third frequency corresponding to the thickness between the first interface and the second interface. The processing unit 5 then deduces, from these frequencies, the distance between each interface and the objective 3, as well as the thickness of the wall (by the difference between these two distances).

Optionally, when at least one of the first beam splitter 10 and the second beam splitter 12 is movable with respect to the objective, the movement of the splitter 10, 12 can, where appropriate, facilitate the distinction between the three measured thicknesses, in particular when two thickness values are close.

The invention claimed is:

1. An objective for a confocal system for spectral interferometric measurement comprising:

a source hole;

a first beam splitter having a face configured to form a reference surface, wherein the first beam splitter comprises at least one of the following elements: an assembly formed of a lens and a partially reflective plate, a lens having a face devoid of anti-reflective treatment, and an assembly comprising a mirror attached and fixed to a lens, an area of the mirror being less than an area of the lens;

a second beam splitter having a partially reflective face, the second beam splitter being positioned downstream of the first beam splitter such that the first beam splitter is located between the source hole and the second beam splitter and that an optical distance between the reference surface and the partially reflective surface is substantially equal to an optical distance between the partially reflective surface and a focal plane of the objective; and a first lens positioned between the first beam splitter and the second beam splitter and a second lens positioned downstream of the second beam splitter, an optical distance between the first lens and the second beam splitter being equal to an optical distance between the second beam splitter and the second lens;

wherein the first beam splitter, the second beam splitter, the first lens and the second lens are coaxial such that optical axes of the first beam splitter, of the second beam splitter, the first lens and the second lens are coincident.

2. The objective according to claim 1, wherein optical characteristics of the first lens and of the second lens are identical.

3. The objective according to claim 2, wherein the distance between the first lens and the second beam splitter is equal to the distance between the second beam splitter and the second lens.

4. The objective according to claim 1, further comprising a mirror mounted downstream of the first beam splitter, the second beam splitter and the first and second lenses, the mirror being inclined with respect to the optical axis of the first and second lenses in order to bend a light beam that it receives from the first and second lenses.

5. The objective according to claim 1, wherein the first beam splitter is divergent and the first lens is convergent.

6. The objective according to claim 1, wherein the source hole also forms a filtering hole of the objective.

7. A confocal system for spectral interferometric measurement comprising a light source and an objective according to claim 1, wherein the light source is connected to the source hole.

8. The system according to claim 7, wherein the light source is polychromatic.

9. The system according to claim 7 further comprising a processing unit connected to the objective, the processing unit being configured to characterise a surface of a sample based on recombined light beams reflected on the surface of the sample and on the reference surface.

10. The system according to claim 9, wherein the processing unit comprises a spectrograph connected to the objective via an optical fibre.

11. The objective according to claim 1, wherein the focal distance of the first lens and of the second lens are identical.

12. The objective according to claim 1, wherein the first beam splitter is convergent and the first lens is divergent.

13. The confocal system according to claim 7, wherein the light source is connected to the source hole by an optical fibre.

* * * * *